United States Patent [19]

Silfvast

[11] 3,755,756

[45] Aug. 28, 1973

[54] GASEOUS LASER EMPLOYING A SEGMENTED DISCHARGE TUBE

[75] Inventor: William Thomas Silfvast, Holmdel Township, Monmouth County, N.J.

[73] Assignee: Bell Telephone Laboratories, Incorporated, Murray Hill, N.J.

[22] Filed: Sept. 30, 1971

[21] Appl. No.: 185,048

Related U.S. Application Data

[63] Continuation-in-part of Ser. No. 145,174, May 20, 1971, abandoned.

[52] U.S. Cl................................. 331/94.5, 330/4.3
[51] Int. Cl............................................ H01s 3/02
[58] Field of Search...................... 331/94.5; 330/4.3

[56] References Cited
UNITED STATES PATENTS
3,621,460  11/1971  Willett............................... 331/94.5

*Primary Examiner*—William L. Sikes
*Attorney*—W. L. Keefauver

[57] ABSTRACT

There are disclosed gaseous or vapor lasers, typically ion lasers, which employ annular elements composed of, or containing in hollow portions thereof, a vaporizable active material to form segments of the bore of the discharge tube. These elements are sandwiched between glass spacers to define the active gain region of the lasers. In operation, discharge heating vaporizes portions of the material from the elements to provide a uniform distribution and stable control of active vapor in the tube. The lasers eliminate the need for external heating of the active material and for appendages to the tube forming reservoirs for the material. Other desirable features include a short warm-up time, a long tube life, and a simplified and inexpensive construction.

12 Claims, 3 Drawing Figures

PATENTED AUG 28 1973 3,755,756

GASEOUS LASER EMPLOYING A SEGMENTED DISCHARGE TUBE

CROSS REFERENCE TO RELATED APPLICATIONS

This application is a continuation-in-part of my previously filed U.S. Pat. application Ser. No. 145,174, filed May 20, 1971, and assigned to the assignee hereof and now abandoned.

BACKGROUND OF THE INVENTION

This invention relates to lasers and, more particularly, to lasers employing vaporizable materials as active media.

Metal ion lasers, such as cadmium ion lasers, are presently among the most efficient and useful lasers in the visible region of the spectrum. The lasers typically employ a Penning-type reaction or an ion-exchange reaction produced by an electrical discharge through a gas mixture of the active metal vapor and helium or neon. In the Penning-type reaction, the helium or neon metastable atoms collide with the neutral metal vapor atoms and ionization occurs. The ionized metal is left in an excited state with excess energy being carried away by emitted electrons. Such lasers are disclosed and claimed in my copending U.S. Pat. application, Ser. No. 819,859, filed Apr. 28, 1969, and assigned to the assignee hereof.

In order to achieve optimum efficiency in metal ion lasers, it is necessary that the metal vapor be substantially uniform throughout most of the length of the discharge tube. Several arrangements for accomplishing this have been previously proposed. For example, a large number of reservoirs or side arms containing the metal in solid or liquid form have been included at frequent intervals along the tube. These tube appendages and the discharge region of the tube are then heated, typically by separate, individually controlled heating means, to vaporize a portion of the metal and to maintain the discharge region at a proper operating temperature. It has also been disclosed in the copending application of T. P. Sosnowski, U.S. Pat. Ser. No. 814,617, filed Apr. 9, 1969, and assigned to the assignee hereof, that a large, externally heated reservoir of the metal disposed in the vicinity of an anode can be employed with the phenomenon of cataphoresis to provide a substantially uniform distribution of a metal ion in the discharge region between the anode and a cathode.

Unfortunately, most of the proposed metal ion lasers have had a limited lifetime for maintaining an even metal vapor distribution. Degradation commences after long periods of continuous operation. In addition, because of the tube appendages and the external heating arrangements, the lasers are often structurally complex and hence quite expensive to fabricate. In most cases, this complexity has also made the lasers difficult to handle and to operate.

Furthermore, discharge heating, which becomes increasingly pronounced as the discharge current supplied to the tube is increased, has been a problem in most of the proposed metal ion lasers. Discharge heating can vaporize random and uncontrolled amounts of the metal from the reservoirs and can tend to distort originally uniform metal vapor distributions. This behavior makes control and adjustment of external heating arrangements relatively difficult during operation.

SUMMARY OF THE INVENTION

I have discovered a laser configuration that alleviates and, under some conditions, completely eliminates these problems. In general, lasers embodied according to the principles of my invention are less expensive to build, more rugged, and simpler to operate than most prior art metal ion lasers and still provide comparable or improved laser efficiencies.

In particular, a laser embodied in accordance with my invention employs one or more elements composed of, or containing in hollow portions thereof, a vaporizable active material. The elements have central apertures which form segments of the laser interaction region. Discharge heating, which can be reasonably controlled by the magnitude of the supplied discharge current, vaporizes portions of the material from the elements to provide a uniform distribution and stable control of the active vapor throughout most of the interaction region.

For vaporizable active materials in rigid solid form, such as cadmium, the elements are machined from the solid material itself. The solid active elements then form rigid and regularly spaced segments of the bore of the discharge tube. For active materials, such as selenium or sulfur, which are typically in liquid or powdered form, respectively, the elements include a rigid casing containing the active material. The casings, like the solid elements, have central apertures that are aligned along the bore of the discharge tube but, unlike the solid elements, they have a perforation communicating with the bore of the tube. The perforation allows the active material to leak into the tube when the material is vaporized.

In a preferred embodiment of my invention, a cadmium ion laser is described comprising tubular spacers and a plurality of annular cadmium elements alternately inserted and rigidly fixed in an outer tube having side arms only for a cathode and an anode which supply the required discharge. This configuration eliminates the need for external heating arrangements and for other appendages to the discharge tube forming reservoirs or side arms for the cadmium. Alternatively, internal annular cathode and anode elements can be inserted in the tube to supply the discharge, thereby eliminating the need for side arms completely. These features make lasers embodied according to my invention desirable as inexpensive, compact and rugged optical frequency sources with many diverse applications.

According to an additional feature of my invention, the warm-up time required to reach a stable maximum output power from the laser at a particular discharge current can be considerably shortened by decreasing the spacing between the active elements in the discharge tube. This decreases the diffusion time of the required concentration of active vapor into the discharge bore where the lasing interaction occurs.

A still further feature of my invention resides in its application to other gaseous lasers of the type employing vaporizable materials as active media. In all such lasers, the lifetimes, or durations, of useful uninterrupted operation can be substantially increased.

BRIEF DESCRIPTION OF THE DRAWINGS

A more complete understanding of the foregoing and other features and advantages of my invention can be obtained from the following detailed description taken with reference to the accompanying drawings, in which.

DESCRIPTION OF THE ILLUSTRATIVE EMBODIMENTS

Figure 1:
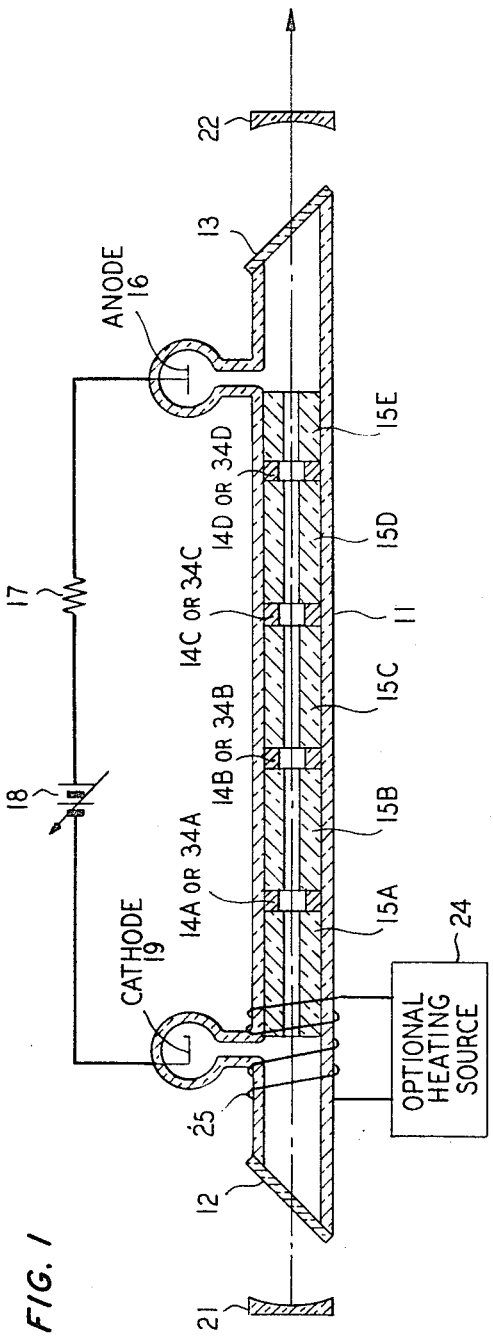
FIG. 1 is a partially pictorial, partially schematic illustration of a segmented bore laser apparatus embodied according to the principles of my invention.

In the laser of FIG. 1, the gas mixture, including the active vapor and an auxiliary or buffer gas, is contained in a quartz or high temperature glass outer tube 11 with quartz end windows 12 and 13 having an antiparallel Brewster-angle orientation. Annular elements 14A through 14D of a vaporizable active material together with quartz or high temperature glass tubular spacers 15A through 15E, form regularly spaced segments of the laser bore extending throughout the discharge length of tube 11. The elements 14 act as sources of the active vapor upon being heated by a direct-current electrical discharge in the tube of sufficient intensity. Such a discharge is established through the gas mixture by the conventional pumping circuit including, in series, anode 16, resistor 17, battery 18 and cathode 19.

The side arms may be eliminated completely from outer tube 11 by using internal annular cathode and anode elements (not shown) in lieu of the conventional cathode 19 and anode 16. These elements would be inserted in the tube and disposed at opposite ends thereof along the laser bore axis.

Illustratively, the laser of FIG. 1 is a cadmium ion laser employing vaporizable solid cadmium elements 14 and helium as an auxiliary gas. It can be operated to obtain a useful output at 441.6 nanometers (nanometers = $1 \times 10^{-9}$ meters) in the blue region of the spectrum or at 325.0 nanometers in the ultraviolet region of the spectrum, or both, by appropriate choice of reflectors 21 and 22 comprising the optical resonator. They may be multiple-layer dielectric coated reflectors or reflecting prisms (not shown). They may also be mounted internally in outer tube 11. In any case, reflector 22 will be typically adapted to be partially transmissive to enable a portion of the coherent radiation to be extracted.

Specifically, in the embodiment of FIG. 1, outer tube 11 has an inside diameter of about 10.0 millimeters. The annular cadmium elements 14 and the spacers 15 are made to fit closely with the inner surface of tube 11. This prevents the electrical discharge from running along that surface, and also insures reasonable rigidity of the inserts in the outer tube. However, it also may be preferable to make the inserts small enough in tube 11 to facilitate construction of the apparatus and to allow for any thermal expansion which may occur during high temperature operation. Outer diameters for cadmium elements 14 and spacers 15 of approximately 9.5 to 9.8 millimeters are adequate for both purposes. The inner bore diameter of spacers 15 is chosen to be the desired laser bore, illustratively about 2.0 millimeters. Spacers 15, excluding spacer 15E, are about 6.0 centimeters in length.

Figure 2:
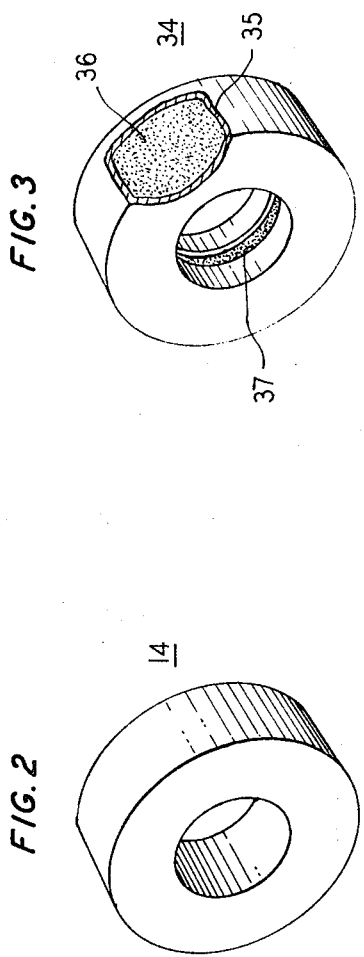
FIG. 2 is a pictorial illustration of one of the active elements 14 of the laser apparatus of FIG. 1.

The cadmium elements, the structure of which can be more readily appreciated from FIG. 2, are machined from essentially pure metallic cadmium of a desired isotope mixture (i.e., preferably of a single isotope $Cd^{114}$), or alternatively from natural cadmium. The latter is generally cheaper; but its use involves some sacrifice in gain. Elements 14 are about 6.0 millimeters long and have an inner bore diameter about 1.0 millimeter greater than the laser bore, that is, the inner bore diameter of the spacers 15. This allows for cadmium build-up which may occur in the vicinity of the elements 14 after long periods of continuous laser operation. The build-up can occur because each of the cadmium elements, except for the one nearest to the anode (element 14D), serves as a sink as well as a source of cadmium due to cataphoresis pumping of positive cadmium ions toward the cathode.

Cadmium elements 14, all of which are simply fabricated with the same larger inner bore diameter as shown in FIG. 1, avoid any deleterious effects the cadmium build-up may have on the discharge. As an alternative, it may be advantageous to have the inner bore diameters of the elements 14 progressively increase from the desired laser bore for element 14D (2.0 millimeters) to a maximum of about 3.0 millimeters for element 14A. Actually, neither scheme is essential to the operation of the segmented bore laser, but both means would be effective in achieving stable, uninterrupted output over long lifetimes.

It is well known that the cadmium vapor, after passing through the discharge region of a cataphoresis-pumped cadmium laser, will condense and deposit as a solid somewhere inside the discharge tube. The vapor preferentially deposits in the cool regions of the tube which would typically include the region beneath cathode 19 in the illustrated laser of FIG. 1. To prevent the spent cadmium from depositing in the region beneath cathode 19 and from interfering with discharge there, it may be desirable to heat the region independently by heating source 24 and heating coil 25 as shown. This forces the condensing cadmium to deposit away from the discharge region and in the vicinity of the side arm containing cathode 19. In addition, it may then be advantageous to include a relatively cool side arm (not shown) appended to the cathode side arm to collect the spent cadmium. These arrangements are only optional, for there are other effective means available in the art for preventing the deposit of spent cadmium in undesirable regions of the discharge tube, which means require neither a separate heating source nor additional side arms. Typical such means applicable to the segmented bore laser of my invention are fully described in the copending U.S. Pat. application of M. B. Klein and T. P. Sosnowski, Ser. No. 46,097, filed June 15, 1970, and assigned to the assignee hereof.

The above-described laser tube, consisting of five spacers (15A–15E) and four cadmium elements (14A–14D) gives an effective discharge length of 26.4 centimeters ($4 \times 6.0$ cm + $4 \times 6.0$ mm), since the bore of spacer 15E contains no cadmium due to cataphoresis toward the cathode. Spacer 15E is preferably made smaller in length than the other spacers to maximize the effective discharge length in the tube.

In operation, the vapor pressure of the cadmium in the tube bore is primarily determined by the temperature of the vaporizable cadmium elements 14. Discharge heating is typically capable of heating the elements 14 substantially uniformly to temperatures in the range of about 150° centigrade to 300° centigrade, depending primarily upon the magnitude of the discharge current supplied to the tube. These temperatures are sufficient for establishing cadmium vapor pressures in the bore of the tube necessary for useful output from the laser. No additional reservoirs of the cadmium or external heating means are required.

To give rise to lasing interaction, the discharge also ionizes the cadmium vaporized from the elements 14. The electric field gradient along the discharge transports the positive cadmium ions toward the region of the cathode 19. Metastable helium atoms are formed and facilitate the establishment of a population inversion in the ionized cadmium, apparently by a collisional transfer in which appropriate elevated energy levels of the cadmium ion are populated and in which excess metastable energy is imparted to free electrons. The stimulated emission of radiation now can result at the resonated wavelength.

The heating of the cadmium elements by the discharge produces a uniform distribution of the cadmium vapor throughout most of the discharge length of the tube. Thus, the lasing interaction is uniform throughout most of the tube and optimum tube efficiency is achieved. Moreover, the segmented bore laser provides stable control of the cadmium vapor pressure simply by adjusting the supplied discharge current. This eliminates problems encountered in most prior art heater-controlled, reservoir-type cadmium ion lasers in which the discharge heating typically tends to distort uniform cadmium distributions, especially at high discharge currents.

Typical operating parameters obtained from a cadmium ion laser of the above-illustrated description employing four annular elements 14 composed of natural cadmium are as follows. With a helium partial pressure of about 6.0 Torr (one Torr equals 1 millimeter of mercury) the laser had a threshold discharge current of approximately 50.0 milliamperes. At a supplied discharge current of 60.0 milliamperes, warm-up times to achieve a stable maximum output power from the tube, and tube lifetimes during which the discharge and output power from the tube were substantially uniform were as low as 2 to 3 minutes and as high as 1,000 hours or more, respectively. The cadmium partial pressure reached an estimated stable value of the order of $10^{-3}$ Torr. An output power of about 7.0 milliwatts at 441.6 nanometers or about 2.0 milliwatts at 325.0 nanometers was produced.

Figure 3:
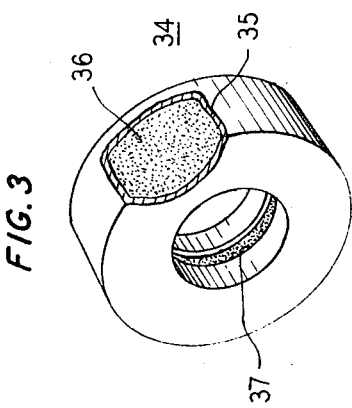
FIG. 3 is a pictorial illustration of a modified active element suitable for active materials having a nonrigid form.

FIG. 3 illustrates an annular active element 34 suitable for use in the segmented bore laser of FIG. 1 in which the active material has a nonrigid form, or in which perforations are necessary to provide sufficiently precise control to the rate of vaporization of the active medium. Nonrigid materials include liquid, granular and powdered materials. Further, some rigid materials would vaporize too irregularly if not contained in the perforated casing. A series of elements like element 34, for example, elements 34A through 34D, would replace elements 14A through 14D of FIG. 1.

Specifically, element 34 includes hollow casing 35 which gives structural rigidity to the element. Casing 35 is filled with vaporizable active material 36. Perforation 37, which communicates with the interaction region of the laser, may be used to load the casing 35 with the active material. It is of a size suitable for substantially confining the active material 36 when not heated and also for passing the material into the discharge tube when vaporized. The perforation may be a single continuous thin slot extending around the circumference of the inner surface of casing 35 as shown, or a series of small holes. A random distribution of passages through the casing is also feasible, if, for example, the casing has a sponge-like structure or a porous structure like that of a pressed ceramic powder.

Illustratively, casing 35 of FIG. 3 is machined from aluminum and subsequently loaded with the vaporizable active material. Typical liquid active materials suitable for use in element 34 would be mercury or selenium. Sulfur or phosphorus, typically in powdered form, could also be used. The size and shape of element 34 could illustratively be the same as that of element 14 described hereinabove.

If necessary, the temperature of the active elements 14 or 34 in the laser of FIG. 1 could be adjusted when the heating provided by the discharge current is excessive or insufficient. A cooling fin on the outside of outer tube 11 of FIG. 1 in the vicinity of each of the active elements 14 or 34 would lower the temperature of the active elements to some extent, or a form of insulation over the entire bore region would raise its operating temperature and thus the vapor pressure of the active material.

In general, the lifetime of a segmented bore laser tube constructed in accordance with the foregoing principles will be primarily determined by the loss rate of the active material from elements 14 or 34. In FIG. 1, the element closest to the anode (element 14D or 34D), should be depleted first since it has no active vapor moving toward it from the region of anode 16. From preliminary studies, an estimate for the lifetime of an operating tube of a segmented bore cadmium ion laser indicates it to be of the order of 500 to 1,000 hours per gram of cadmium. Accordingly, the size (i.e., length) of the active elements can be determined by the required lifetime of the laser tube.

Although four active elements are shown in FIG. 1, the actual number may vary widely. For example, in ion lasers, it is feasible to have an embodiment including only one element in the vicinity of the anode. Cataphoresis pumping of the active ions vaporized from the element toward the cathode could then provide a reasonably uniform ion distribution in the tube. There are, nevertheless, three basic advantages of having many active elements spaced at frequent intervals along the laser interaction region. First of all, it provides a greater quantity of active material available for use in the tube and hence, as indicated above, can increase the lifetime of the laser. Secondly, it minimizes the diffusion time of the active material from the discharge-heated elements 14 or 34 into the laser bore and thereby shortens the warm-up time required to reach optimum operating vapor pressures. Thirdly, it tends to stabilize the discharge current, thus requiring less stringent controls from the power supply.

From the foregoing, it should be appreciated that the warm-up times, the tube lifetimes and the output powers obtainable from a laser employing a segmented bore can be varied and substantially improved over those for the illustrative embodiment without departing from the scope of my invention. Numerous parameters including the auxiliary gas partial pressure, the discharge bore diameter, the tube length, the size, shape and spacing of the active elements, and others, can be varied to provide the desired characteristics of the laser in each particular case. The optimum arrangement of parameters in each laser can be readily determined experimentally by those skilled in the art.

Furthermore, it should be understood that my invention is not limited to cadmium ion lasers, nor is it necessarily limited to metal ion lasers employing Penning-type reactions. Other gaseous lasers employing vaporizable materials as active media, whether in rigid or non-rigid form, may be made and used according to the foregoing principles of my invention. Other active metals suitable for my invention are disclosed and claimed in my copending application referred to hereinabove.

I claim:

1. A laser comprising means forming an interaction region in which stimulated emission of radiation can occur, said forming means including at least one element including a vaporizable medium, said element having an aperture through which said interaction region passes, and means acting upon said element for vaporizing a portion of said medium from said element into said region and establishing a population inversion for said emission in said vaporized medium.

2. A laser according to claim 1 in which said element consists of said vaporization medium in rigid solid form.

3. A laser according to claim 1 in which said element comprises a hollow casing containing said vaporizable medium, said casing having a perforation communicating with said interaction region for passing said medium when vaporized.

4. A laser according to claim 1 in which said acting means comprises a cathode and an anode disposed to supply an electrical discharge through said interaction region.

5. A laser comprising an outer tube supplied with an auxiliary gas, a plurality of tubular spacers having an outside diameter less than the inside diameter of said outer tube, and, as a source of an active medium, a plurality of annular elements of a vaporizable ionizable solid having an outside diameter less than the inside diameter of said outer tube, said spacers and said elements alternately inserted in said outer tube to form an interaction region in which the stimulated emission of radiation can occur, and a cathode and an anode disposed to supply a direct-current electrical discharge through said interaction region to vaporize a portion of said solid from said elements and to excite said laser.

6. A laser according to claim 5 in which the supplied discharge current is greater than a threshold level to provide a concentration of said vapor vaporized from said elements sufficient for producing gain substantially uniformly throughout a major portion of said interaction region.

7. A laser according to claim 5 in which said annular elements have an inside diameter greater than the inside diameter of said tubular spacers.

8. A laser comprising an outer tube supplied with helium as an auxiliary gas, a plurality of tubular spacers having an outside diameter less than the inside diameter of said outer tube, and, as a source of an active medium, a plurality of annular elements of cadmium in a vaporizable solid form having an outside diameter less than the inside diameter of said outer tube, said spacers and said elements alternately inserted in said outer tube to form an interaction region in which the stimulated emission of radiation can occur, and a cathode and an anode disposed to supply a direct-current electrical discharge through said interaction region to vaporize a portion of said cadmium from said elements and to excite said laser.

9. A laser comprising an outer tube supplied with an auxiliary gas, a plurality of tubular spacers having an outside diameter less than the inside diameter of said outer tube and, as a source of an active medium, a plurality of annular elements having an outside diameter less than the inside diameter of said outer tube, said annular elements comprising a hollow annular casing containing a vaporizable active medium, said casing including a perforation for passing said medium when vaporized, said spacers and said annular elements alternately inserted in said outer tube to form an interaction region in which the stimulated emission of radiation can occur, and a cathode and an anode disposed to supply a direct-current electrical discharge through said interaction region to vaporize a portion of said medium from said elements and to excite said laser.

10. A laser comprising a tube supplied with an auxiliary gas, at least one element including a vaporizable active medium, and having an aperture passing through said element, said element being inserted in said tube and with said tube forming an interaction region extending through the aperture in which the stimulated emission of radiation can occur, and a cathode and an anode disposed to supply an electrical discharge through said interaction region to vaporize a portion of said medium from said element and to excite said laser.

11. A laser according to claim 10 in which said element consists of said vaporizable active medium in rigid solid form.

12. A laser according to claim 10 in which said element comprises a hollow casing containing said vaporizable active medium, said casing having a perforation communicating with said interaction region for passing said active medium when vaporized.

* * * * *